United States Patent [19]
Hein

[11] Patent Number: 5,913,396
[45] Date of Patent: Jun. 22, 1999

[54] ROTATIONAL CONTROL APPARATUS WITH BELLVILLE RETURN SPRING ASSEMBLY

[75] Inventor: Dave W. Hein, Oakdale, Minn.

[73] Assignee: Horton, Inc., Minneapolis, Minn.

[21] Appl. No.: 08/829,061

[22] Filed: Mar. 31, 1997

[51] Int. Cl.[6] .................................................. F16D 13/50
[52] U.S. Cl. .................................. 192/70.28; 192/85 CA
[58] Field of Search ........................... 192/70.28, 85 CA, 192/87.1, 101, 85 AA

[56] References Cited

U.S. PATENT DOCUMENTS

| | | | |
|---|---|---|---|
| 3,011,608 | 12/1961 | Hansen | 192/70.28 X |
| 3,091,949 | 6/1963 | Sink . | |
| 3,104,000 | 9/1963 | Erickson . | |
| 3,444,971 | 5/1969 | Davidson . | |
| 3,800,928 | 4/1974 | Pray . | |
| 3,804,219 | 4/1974 | Cummings, III . | |
| 3,805,933 | 4/1974 | Pray . | |
| 4,093,054 | 6/1978 | Johns . | |
| 4,226,318 | 10/1980 | Morgan . | |
| 4,274,525 | 6/1981 | Raab et al. . | |
| 4,537,295 | 8/1985 | Fädler et al. . | |
| 4,548,309 | 10/1985 | Braun . | |
| 4,564,097 | 1/1986 | Kabayama . | |
| 4,655,337 | 4/1987 | Carmillet et al. . | |
| 4,683,997 | 8/1987 | Stockmar et al. | 192/70.28 X |
| 4,775,041 | 10/1988 | Boffelli . | |
| 4,776,444 | 10/1988 | Wörner et al. . | |
| 4,802,564 | 2/1989 | Stodt | 192/70.28 |
| 4,844,219 | 7/1989 | Stockmar | 192/70.28 X |
| 5,016,742 | 5/1991 | Peier | 192/70.28 X |
| 5,082,387 | 1/1992 | DeVries . | |
| 5,117,959 | 6/1992 | Graton . | |
| 5,147,246 | 9/1992 | Focqueur et al. . | |
| 5,217,409 | 6/1993 | Dalbiez . | |
| 5,400,884 | 3/1995 | Matsuoka | 192/70.28 X |

FOREIGN PATENT DOCUMENTS 1299905  12/1962  France .

OTHER PUBLICATIONS

Shingley, Mechanical Design Engineering, Fourth Ed., 1993, pp. 474–475.

Multiple Disc Clutches and Brakes, Hydraulic/Pneumatic Actuated, Logan Clutch Corporation, Catalog 101, Copyright 1996.

*Primary Examiner*—Charles A Marmor
*Assistant Examiner*—Saúl J. Rodriquez
*Attorney, Agent, or Firm*—Alan D. Kamrath; Petevson, Wicks, Nemer & Kamrath

[57] ABSTRACT

A versatile apparatus (2) for controlling the transmission of rotational forces between first and second rotatable members preferably takes the form of a clutch that can be activated by axially shifting an internal actuation member (140) through the introduction of either liquid or gaseous mediums. The clutch includes first and second transmission members (177, 281) which are rotatably mounted within a housing (5) and adapted to be attached to the first and second rotatable members respectively. A coupling assembly (226), preferably including first and second sets of axially spaced interface elements (252–254 and 274, 275), is interposed between the transmission members (177, 284) within the housing and axial movement of the actuation member (140) causes the interface elements (252–254 and 274, 275) to be frictionally engaged. In the preferred embodiment, the first and second sets of axially spaced friction interface elements (252–254 and 274, 275) are biased to a disengaged position by back-to-back arranged belleville washers (264–268), which maintain a constant disengagement force regardless of wear on the frictional surfaces thereof. To minimize associated manufacturing costs, the housing (5) is cast from aluminum. To assure that the clutch can work effectively with various fluid mediums, internal surfaces (19, 58) of the housing (5), against which seals (155, 170) of the actuation member (140) slideably abut, are coated with a hard coat anodize having a TEFLON and epoxy filler.

9 Claims, 2 Drawing Sheets

ROTATIONAL CONTROL APPARATUS WITH BELLVILLE RETURN SPRING ASSEMBLY

BACKGROUND OF THE INVENTION

The present invention relates generally to rotational control apparatus and, more particularly, to an apparatus for controlling the transmission of rotational forces between first and second relatively rotatable members, and specifically in the preferred form to a friction clutch.

When it is desired to intermittently transmit rotational forces from one component to another component, it is commonplace to interconnect the components with a clutch and then to selectively activate and deactivate the clutch as needed. Known clutch arrangements can be controlled using electrical, mechanical, pneumatic or hydraulic based actuation systems. Fluid actuated systems typically utilize pressure developed in a piston/cylinder arrangement to apply an axial load on a coupling assembly in order to transmit torque between the rotatable components.

In the art, known fluid actuated clutches have been designed for exclusive use with a particular type of actuation fluid. More specifically, fluid actuated clutches are designed to operate with either a gaseous medium or a liquid medium, but not both. Therefore, a pneumatic actuated clutch cannot operate properly with hydraulic fluid, generally due to the characteristics of pneumatic seals. More specifically, the pneumatic seals would not properly function to prevent the flow of hydraulic fluid there across. Instead, the hydraulic fluid would weep past the pneumatic seals and contaminate the friction interface of the coupling assembly. In addition, typical finishes of pneumatic seal surfaces are generally insufficient for hydraulic use as the hydraulic oil tends to become embedded in the surface imperfections, thereby developing a poor sealing surface. This is particularly true where the piston/cylinder surfaces are cast from aluminum. The surface finish required to seal hydraulic oil is very critical, with ms values of at least eight (8) being required for proper seal life. Although the costs associated with manufacturing cast components is attractive, the cast surfaces cannot be finished to this degree. Therefore, clutch manufacturers must resort to utilizing extruded or milled materials for at least the sealing surface components for hydraulically actuated clutches. Of course, this undesirably adds to the overall cost of the hydraulically actuated clutch.

Commensurate problems are created if gaseous mediums are utilized to actuate a clutch designed for liquid mediums. For instance, seals used for movable components in any fluid actuated clutch require a certain amount of lubrication. A lack of lubrication in the piston/cylinder area results in increased frictional forces, thereby preventing proper actuation of the clutch. In hydraulic oil actuated clutches, the required lubrication is provided by the actuating fluid medium itself, but if a gaseous medium is utilized, the source of lubrication is lost. Therefore, clutches designed for use with hydraulic oil will not be provided with a necessary amount of lubrication if a pneumatic pressure source is utilized.

Based on the above problems, clutch manufacturers must produce different types of clutches depending on the particular actuation fluid. Of course, designing, producing and assembling separate clutch components for pneumatic and hydraulic based systems represent a significant cost which must inevitably be borne by the consumer. Therefore, there exists a need in the art for a rotational control apparatus which is designed for more universal applicability and, more specifically, to a clutch arrangement which can effectively operate as either a liquid or a gaseous based actuation system.

In addition to the above concerns, manufacturers of friction clutches must consider the effect of wear on the long tern operability of the clutches. In most friction clutches, the transmission of torque is accomplished by supplying an actuating fluid medium into a pressure chamber to cause shifting of a piston which, in turn, causes engagement of frictional material carrying elements of a coupling assembly. A return spring is generally incorporated which biases the coupling assembly to a disengaged position. Therefore, when the actuating fluid is withdrawn from the pressure chamber, the frictional elements will be automatically spread apart. Most typically, a compression spring is used to bias the frictional elements in this manner.

Unfortunately, compression springs generate a preset amount of force per unit of length over which they are compressed. The ratio of force generated to length compressed is referred to as the spring value (K). With a compression spring, the amount of spring deflection increases, in a linear fashion, with increasing load. When used in a friction clutch, the spring will become increasingly loaded as a function of the axial wear of the friction material. In some situations, the force needed to disengage the coupling assembly is substantial, even up to thirty (30) percent of the required clutch engagement force. In other words, the larger the amount of torque required by the clutch, generally the larger the required disengagement or return force. To generate this large of a return force, clutch springs having high K values must be utilized. However, as the friction material wears, a substantial increase in the load supplied by the springs will develop. This increase in the return force due to the wearing of the friction material reduces the load carrying capacity of the clutch.

Based on the above, there also exists a need in the art for an apparatus for controlling the transmission of rotational forces between multiple rotatable members wherein the return force generated by the apparatus remains constant, regardless of the amount of wear on the frictional elements. More specifically, there exists a need for a clutch arrangement wherein a constant return force is developed such that the torque capacity of the clutch can be maintained constant over the entire range of deflection.

SUMMARY OF THE INVENTION

The present invention solves these and other deficiencies and problems in the art by providing a rotational control apparatus that can be actuated by supplying a fluid medium, either in a liquid or a gaseous state, into a pressure chamber to cause a piston to shift a coupling assembly into an engaged position. In the preferred form, multiple sealing units are provided to prevent undesirable leakage of the fluid medium from the pressure chamber. In order to prevent the fluid medium from leaking across the sealing units, particularly when an hydraulic actuating fluid is used in combination with a cast aluminum housing, the sealing surfaces are provided with a hard coat anodize with a TEFLON and epoxy filler in order to fill inherent pores in the material surfaces and then the surfaces are suitably finished. In the preferred embodiment, each of the sealing units includes first and second sealing members, with the first sealing member being constituted by a lip seal and the second sealing member being an O-ring.

In further accordance with a preferred embodiment of the invention, the rotational control apparatus constitutes a clutch and the coupling assembly includes a plurality of axially spaced, alternating first and second sets of frictional plates, with each of the plates in the first set being mounted for concurrent rotation with a first transmission member of the clutch and each of the plates in the second set being mounted for rotation with a second transmission member thereof. Each of the plates in at least one of the sets of frictional plates is provided with a frictional material adapted to engage an adjacent plate of the second set of plates in order to rotationally interconnect the first and second transmission members when the clutch is actuated. Spring washers are interposed between the plates and bias the coupling assembly into a disengaged position. More specifically, back-to-back arranged belleville washers are incorporated as part of the coupling assembly and create a return force tending to disengage the first and second frictional plate sets. The belleville washer arrangement is designed to create a constant return force, even following wear of the frictional material, thereby enabling the clutch to possess a sustained torque capacity.

It is thus an object of the present invention to provide an apparatus for controlling relative rotation between two members wherein a single unit design can be utilized with various fluid pressure supply sources, thereby presenting a more universal arrangement.

It is also an object of the present invention to provide for the effective use of cast aluminum components in connection with a rotational control apparatus that can be hydraulically actuated, thereby reducing associated manufacturing costs.

It is further an object of the present invention to provide a novel rotational control apparatus that provides a constant disengagement force to frictional coupling members thereof, even following prolonged periods of use and wear.

These and other objects, features and advantages of the present invention will become more readily apparent from the following detailed description of a preferred embodiment of the invention when taken in conjunction with the drawings wherein like reference numerals refer to corresponding parts in the several views.

Figure 1:
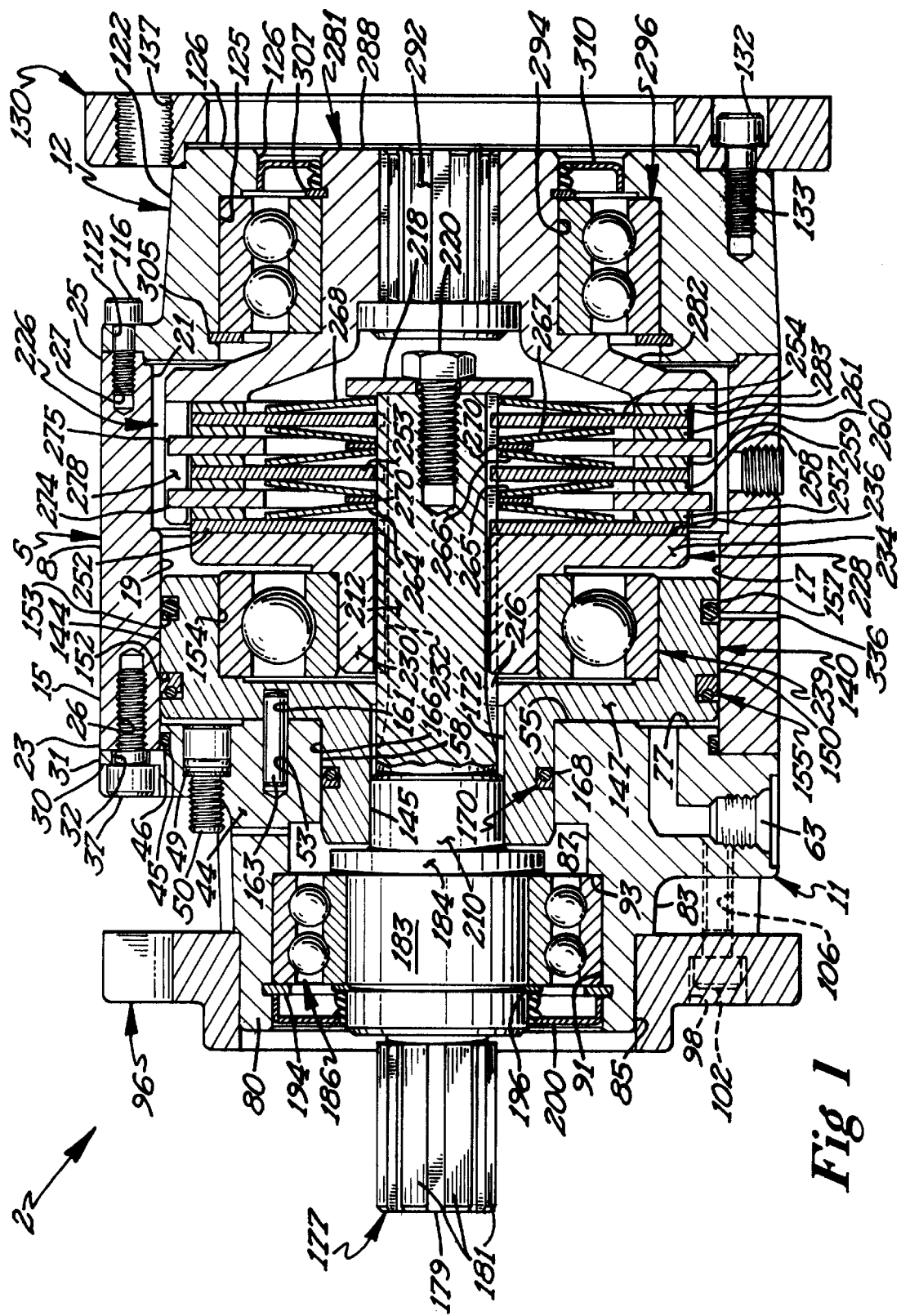
FIG. 1 is a cross-sectional view of a rotational control apparatus constructed in accordance with a preferred embodiment of the present invention.

It should be noted that all the figures are drawn for ease of explanation of the basic teachings of the present invention only; the extensions of the figures with respect to number, position, relationship and dimensions of the parts to form the preferred embodiment will be explained or will be within the skill of the art after the following teachings of the present invention have been read and understood. Further, the exact dimensions and dimensional proportions to conform to specific force, weight, strength and similar requirements will likewise be within the skill of the art after the following teachings of the present invention have been read and understood.

Furthermore, when the terms "inner", "outer", "first", "second", "radially", "axially", "circumferentially" and similar terms are used herein, it should be understood that these terms have reference only to the structure shown in the drawings as it would appear to a person viewing the drawings and are utilized only to facilitate describing the invention.

DETAILED DESCRIPTION

With initial reference to FIG. 1, an apparatus for controlling the transmission of rotational forces between first and second rotatable members in accordance with the preferred teachings of the present invention is generally indicated at 2. In the most preferred embodiment of the invention, apparatus 2 constitutes a clutch used, for example, in transmitting power to an auxiliary control device on a vehicle. However, as will become more fully evident below, the present invention may also take other forms, such as a brake assembly which is also used for controlling the transmission of forces between first and second relatively rotatable members. As shown in this figure, clutch 2 includes a housing 5 that is defined by a central housing section 8 to which are connected first and second end housing sections 11 and 12. Central housing section 8 is preferably cylindrical in shape and includes an outer surface 15 and an inner surface 17. As depicted, inner surface 17 defines axially spaced first and second surface portions 19 and 21. Central housing section 8 also has first and second axially spaced ends 23 and 25 which are each provided with a plurality of circumferentially spaced, threaded holes, such as that shown at 26 and 27 for first and second ends 23 and 25 respectively.

First end housing section 11 includes an outermost radial portion 30 having an outer, axially extending surface 31. Outermost radial portion 30 is provided with a plurality of countersunk apertures 32. Apertures 32 are adapted to be aligned with threaded holes 26 and receive bolts 37 (only one of which is visible in the cross-sectional view of FIG. 1) screwed into a respective threaded hole 26. In this manner, first end housing section 11 is fixedly secured to central housing section 8 with outer axially extending surface 31 of outermost radial portion 30 being generally flush with outer surface 15 of central housing section 8.

First end housing section 11 also includes an inner radial portion 44 formed with an annular groove 45 within which is received an annular seal 46. In the preferred embodiment, annular seal 46 constitutes a O-ring which is adapted to sealingly engage first surface portion 19 of central housing section 8. Inner radial portion 44 is also provided with a through hole (not labeled) within which is slidably mounted, in a sealed manner, a slug 49. A screw 50 is threadably received in a portion of the through hole and is adapted to abut slug 49. Screw 50 and slug 49 may be used to manually actuate clutch 2 as will be discussed further below. Inner radial portion 44 is also formed with a bore 53 that opens at radial surface 55 of inner radial portion 44. Inner radial portion 44 terminates radially inwardly of bore 53 such that inner radial portion 44 includes a central through hole defined by an inner axially extending surface 58 thereof.

First end housing section 11 is also formed with a fluid port 63 for use in introducing an activating fluid into a variable volume pressure chamber (not separately labeled) defined within housing 5. Port 63 opens at a grooved section 77 of radial surface 55. Grooved section 77 forms part of the variable volume pressure chamber defined within housing 5. First end housing section 11 further includes an axially extending, annular terminal end 80 having an outer surface 83 along which is defined a reduced diametric portion 85 of annular terminal end 80 and an inner surface 87 that defines a through hole leading to the central through hole defined by axially extending surface 58. Inner surface 87 actually includes an enlarged axial surface portion 91 leading to an internal abutment wall 93. Shown secured to annular terminal end 80 is a flange mounting plate 96 that is provided with a plurality of circumferentially spaced countersunk apertures, one of which is indicated at 98. Each aperture 98 is adapted to receive a respective bolt 102 threadably received within a respective axially extending bore 106 formed in inner radial portion 44. At this point, it should be realized that flange mounting plate 96 is adapted to secure housing 5 to another device having a first rotatable output member. Flange mounting plate 96 is formed as a separate element from housing 5 such that different flange mounting plate arrangements can be attached to housing 5 in order to enable apparatus 2 to be utilized with a first rotatable member associated with any one of various devices. Therefore, the particular structure of flange mounting plate 96 should not be considered a limiting feature of the present invention.

Second end housing section 12 includes an outer radial flange 110 provided with a plurality of circumferentially spaced through holes, one of which is indicated at 112. Each through hole 112 is adapted to receive a bolt 116 that is threadably secured within a respective threaded hole 27 of central housing section 8. Second end housing section 12 also includes an axially extending portion 122 having an inner axial surface 125 that leads to a radially extending portion 126 having an inner axial surface 127.

As depicted, the preferred construction of second end housing section 12 includes a flange mounting plate 130 that is adapted to mount housing 5 to another device (not shown) having a second rotatable member adapted to be connected to apparatus 2. In a manner analogous to flange mounting plate 96, flange mounting plate 130 can take various forms in accordance with the present invention, depending upon the particular device to which apparatus 2 is to be secured. As shown, flange mounting plate 130 is secured to second end housing section 12 by means of a plurality of bolts 132 that are threadably secured within bores 133 formed in second end housing section 12. In addition, flange mounting plate 130 is further provided with a plurality of through holes 137 for use in attaching flange mounting plate 130 to another device. At this point, it should be noted that housing 5 can be formed of various materials without departing from the scope of the invention. However, in accordance with a preferred embodiment, central housing section 8 and first and second end housing sections 11 and 12 are preferably cast from aluminum in order to reduce the weight of apparatus 2 and the manufacturing costs associated therewith.

Axially slidably mounted within housing 5 is an actuation member 140. Actuation member 140 generally constitutes a piston having an outer radial portion 144, an inner radial portion 145 and a connecting portion 147. Outer radial portion 144 has associated therewith an outer axial surface 150, in which is formed a pair of axially spaced grooves 152 and 153, and an inner axial surface 154. Positioned within groove 152 is a first annular sealing unit 155 and positioned within groove 153 is an auxiliary seal 157. In accordance with the preferred embodiment, auxiliary seal 157 is constituted by an O-ring and first sealing unit 155 preferably includes a combination lip seal/O-ring seal arrangement as will be more fully detailed with reference to FIGS. 2 and 3. However, at this point, it should be noted that first sealing unit 155 and auxiliary seal 157 are placed in sealing engagement with inner surface 17 of central housing section 8.

Actuation member 140 has an inner radial surface (not separately labeled) that extends generally parallel to radial surface 55 and which is provided with a bore 161 aligned with each bore 53. Each of the aligned bores 53 and 161 receive a pin 163 which functions to prevent relative rotation between piston 140 and housing 5, but which permits axial shifting of piston 140 relative to housing 5. Inner radial portion 145 of piston 140 includes an outer surface 166 that is formed with an annular groove 168. Positioned within annular groove 168 and sealingly engaged with inner axially extending surface 58 is a second sealing unit 170. In accordance with the preferred embodiment, second sealing unit 170 is constructed in a manner identical to first sealing unit 155 as will be more fully detailed below with reference to FIGS. 2 and 3. Inner radial portion 145 also includes an inner surface 172 defining a hole axially extending through piston 140.

Also extending within housing 5 is a first transmission member 177 which, in the preferred embodiment, constitutes an input driveshaft for apparatus 2. First transmission member 177 includes a first end 179 that projects out of housing 5 and which is externally splined at 181. First end 179 leads to an enlarged diametric portion 183 which, in turn, leads to a still further enlarged diametric portion 184. As first transmission member 177 is adapted to be rotatably mounted within housing 5, a first bearing unit 186 is positioned between first diametric portion 183 and inner axial surface portion 91 of first end housing section 11. More specifically, bearing unit 186 includes an outer race that extends along inner axial surface portion 91 and which is engaged with abutment wall 93, and an inner race which is adapted to rotate with first diametric portion 183 and abuts second diametric portion 184. An outer retaining ring 194 extends within an annular groove formed in surface portion 91 and maintains the outer race in the desired position. An inner retaining ring 196 extends within an annular groove formed in first diametric portion 183 to similarly retain the inner race in position. Although not shown in FIG. 1, bearing unit 186 may be of the sealed type. However, in order to prevent the ingress of debris which might contaminate and minimize the effectiveness of bearing unit 186, a sealing cap 200 is frictionally engaged with inner axial surface portion 91 and first diametric portion 183 which allows first transmission member 177 to rotate relative to sealing cap 200, but further prevents the possibility of contaminants reaching bearing unit 186.

First transmission member 177 also includes a stub portion 210 integrally axially extending from diametric portion 184, as well as an elongated, cantilevered shaft section 212 integrally axially extending from portion 210 and having a terminal end. As shown, stub portion 210 is arranged within inner radial portion 145 and rotates relative to piston 140. Meanwhile, shaft section 212 includes a plurality of external splines 216 and is adapted to have secured thereto an end plate 218 by means of a bolt 220 that is threadably received within elongated shaft section 212.

Also positioned within housing 5 is a coupling assembly generally indicated at 226. Coupling assembly 226 includes a drive disk 228 having an axial portion 230 that is provided with splines 232 for rotatably interconnecting drive disk 228 with shaft section 212 of first transmission member 177 while allowing axial movement therebetween. Drive disk 228 also includes a radial portion 234 having a radial surface 236. Drive disk 228 is rotatably supported within housing 5 through a second bearing unit 239. Second bearing unit 239 includes an outer race which is frictionally fit or otherwise secured at inner axial surface 154 of piston 140, and an inner race which is mounted to axial portion 230 for concurrent rotation with drive disk 228. As depicted, second bearing unit 239 is preferably of the sealed type.

Figure 4:
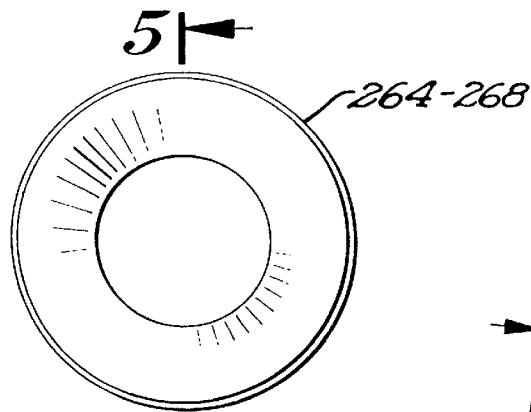
FIG. 4 is a top plan view of a belleville washer incorporated in the rotational control apparatus of FIG. 1.

Coupling assembly 226 also includes a first set of interface elements constituted by first, second and third friction plates 252–254. In the preferred embodiment, each friction plate 252–254 is spline connected to shaft section 212 of first transmission member 177. First friction plate 252 abuts with the radial surface 236 of drive disk 228. Friction plates 252–254 have respective friction pads 257–261 affixed thereto. More specifically, a first friction pad 257 is affixed to an outer radial portion of first friction plate 252, friction pads 258 and 259 are affixed to opposing radial surfaces of second friction plate 253 and friction pads 260 and 261 are affixed to opposing radial surfaces of third friction plate 254. Interposed between friction plates 252–254 are a plurality of spring washers 264–268. In the preferred embodiment, spring washers 264–268 constitute belleville washers, the preferred construction of which will be further detailed below with reference to FIGS. 4 and 5. As will also be detailed below, spring washers 264–268 are adapted to bias friction plates 252–254 to a disengaged position and to provide a constant return force for coupling assembly 226 regardless of any wear that occurs on friction pads 257–261. To accomplish this function, spring washers 264–268 are specifically arranged in a parallel fashion within coupling assembly 226. More specifically, spring washers 264 and 265 are arranged back-to-back such that inner edges of spring washers 264 and 265 abut one another while the main body portions of the spring washers 264 and 265 diverge at an acute angle. As shown, spring washers 264 and 265 are positioned between first and second friction plates 252 and 253. In a similar manner, spring washers 266 and 267 are arranged back-to-back and are positioned between second and third friction plates 253 and 254. Spring washer 268 acts between third friction plate 254 and end plate 218. In the preferred embodiment, spring washers 264–268 are freely mounted about shaft section 212 with inner edges of spring washers 264 and 265 abutting on opposite sides of a central washer 270 and inner edges of spring members 266 and 267 abutting on opposite sides of a central washer 271.

Coupling assembly 226 also includes a second set of interface elements constituted by a pair of friction plates 274 and 275 which are spline connected to axially extending, circumferentially spaced fingers 278 of a second transmission member 281. Member 281 further includes a frustoconical shaped portion 282 terminating in a radial surface 283. Fingers 278 extend from and are integrally formed with radial surface 283. More specifically, friction plate 274 is spline connected for rotation with second transmission member 281 and is arranged between first and second friction pads 257 and 258; friction plate 275 is spline connected for rotation with second transmission member 281 and is positioned between friction pads 259 and 260; and radial surface 283 of second transmission member 281 is juxtapose friction pad 261.

Portion 282 is integrally formed with a hub 288. Hub 288 includes a splined, internal bore 292, as well as an outer, axially extending surface 294 for use in rotatably mounting second transmission member 281 relative to housing 5 through the use of a third bearing unit 296. In general, third bearing unit 296 is similarly constructed to bearing unit 186 and therefore includes an outer race and an inner race. The outer race is frictionally fit or otherwise secured to second end housing section 12 and is prevented from axially shifting due to the presence of radially extending portion 126 and an outer retaining ring 305 received in a groove formed in axial surface 125. The inner race is similarly frictionally fit or otherwise secured to axial portion 288 and is prevented from axially shifting due to its engagement with portion 282, as well as the presence of an inner retaining ring 307 received in a groove formed in surface 294 of hub 288. Again, third bearing unit 296 can be of the sealed type although this is not depicted in FIG. 1. However, a sealing cap 310 is preferably provided in order to prevent the ingress of debris and other contaminants which may limit the life of third bearing unit 296 in a manner analogous to sealing cap 200.

When utilizing clutch 2, as indicated above, flange mounting plate 96 is adapted to be secured to a device having a first rotatable member (not shown) which is to be attached for concurrent rotation with first transmission member 177 by a means of splines 181. In the preferred embodiment, member 177 constitutes the input drive for clutch 2. By this connection, rotational movement will be imputed to first transmission member 177 which will cause rotation of shaft section 212, as well as drive disk 228, friction plates 252–254 and friction pads 257–261. In a similar manner, flange plate 130 is adapted to be attached to a second device having a second rotatable member adapted to be received in and spline connected to axial portion 288 of second transmission member 281. Therefore, this second rotatable member will be mounted for concurrent rotation with second transmission member 281 which constitutes the output for clutch 2.

In FIG. 1, clutch 2 is shown in its de-activated position wherein spring washers 264–268 bias friction plates 252–254 into respective disengagement positions. However, when it is desired to rotatably interconnect first and second transmission members 177 and 281, a pressurized fluid medium is introduced into housing 5 at fluid port 63. This fluid medium will flow through port 63 and initially fill the grooved section 77 formed as part of first end housing section 11. The fluid medium will then continue to fill the variable volume pressure chamber defined between piston 140 and housing 5. Therefore, this pressurized fluid will tend to axially shift piston 140 in a direction causing frictional engagement between the first and second sets of interface elements composed of plates 252–254 and plates 274 and 275. More specifically, drive disk 228 will be caused to axially shift in unison with piston 140 through second bearing unit 239 to reduce the axial distance between drive disk 228 and radial surface portion 282 of second transmission member 281 such that friction pads 257–261 will come into respective frictional engagement with friction plates 274 and 275, as well as radial surface portion 282. Grooved section 77 is provided to increase the surface area through which the pressurized fluid medium acts upon piston 40 in order to overcome any frictional forces tending to resist the shifting of piston 140. Of course, the shifting of clutch 2 towards an activated position due to the supply of the fluid medium is done against the biasing force developed by spring washers 264–268 which tend to position coupling assembly 226 in a disengaged condition. In any event, the biasing force of spring washers 264–268 can be overcome by the introduction of the fluid medium to thereby rotatably interconnect first and second transmission members 177 and 281. In addition, if fluid pressure is lost, clutch 2 can be mechanically actuated by manually rotating screw 50 to cause slug 49 to abut and linearly shift piston 140.

Figure 2:
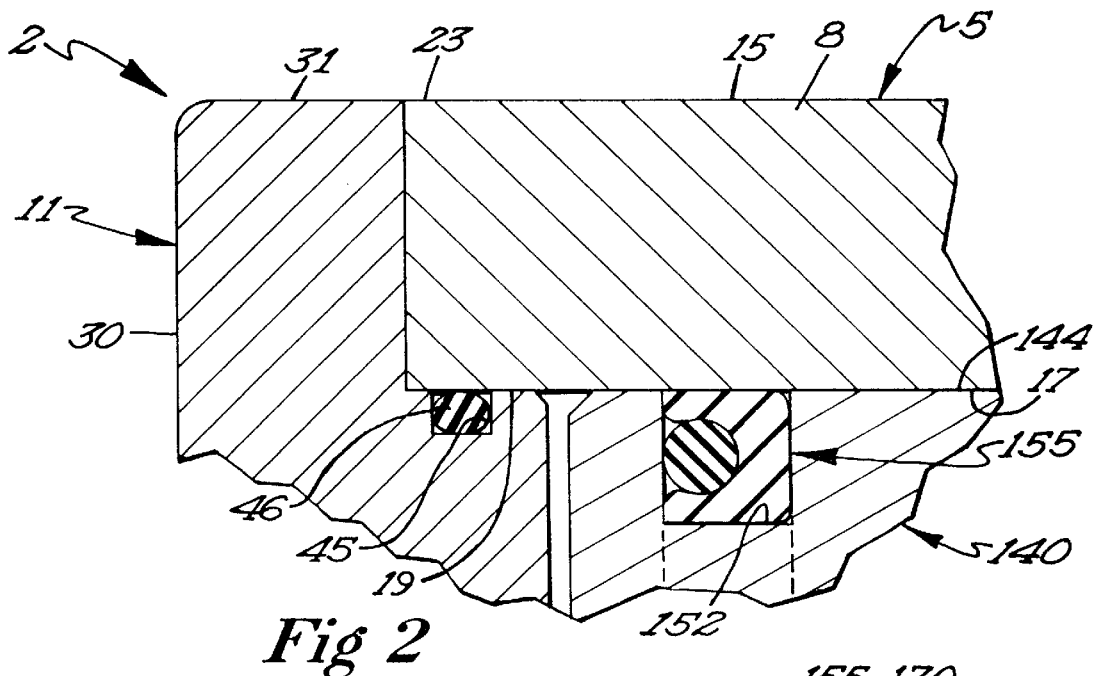
FIG. 2 is an enlarged cross-sectional view of a portion of the rotational control apparatus of FIG. 1.
Figure 3:
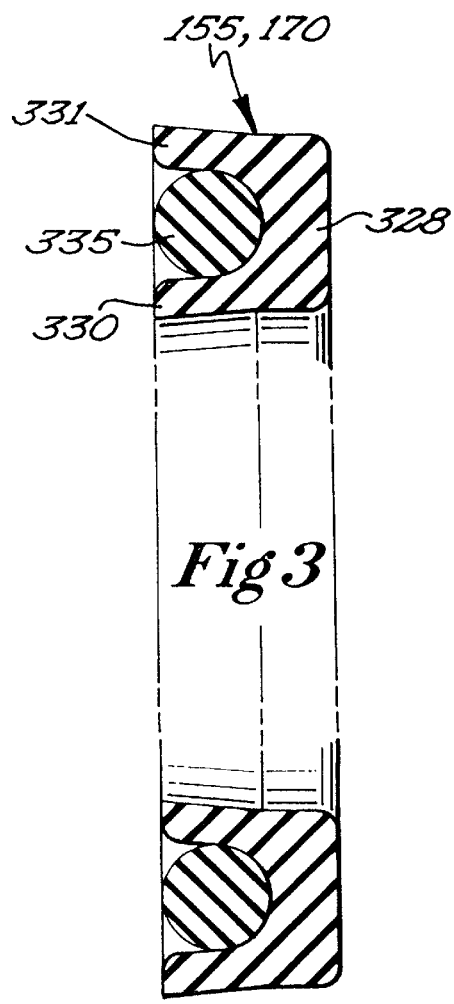
FIG. 3 is a cross-sectional view of a sealing unit incorporated in the rotational control apparatus of FIG. 1.

In accordance with an important aspect of the invention, apparatus 2 is specifically designed to be activated by a selected one of either liquid and gaseous fluid mediums, preferably hydraulic oil and air respectively. In order to accomplish this function, first and second sealing units 155 and 170 are preferably constructed in the manner set forth as best shown in FIGS. 2 and 3. More specifically, each of these sealing units 155 and 170 is constituted by a lip seal having a main body portion 328 from which extend inner and outer lips 330 and 331. Defined between inner and outer lips 330 and 331 is a recessed area that receives an O-ring 335. In the case of sealing unit 155, outer lip 331 will slide on inner surface 17 of central housing section 8 with movement of piston 140. More specifically, O-ring 335 abuts one axial end wall of groove 152 (see FIG. 2) and main body portion 328 is sandwiched between O-ring 335 and the other axial end wall of groove 152. In addition, O-ring 335 spaces inner and outer lips 330 and 331 such that inner lip 330 is forced against an inner radial wall of groove 152 and outer lip 331 contacts inner surface 17. Sealing unit 170 is arranged in a commensurate fashion. During use, the pressurized fluid medium inputted through port 63 will force lips 330 and 331 to expand thereby increasing the interference between sealing units 155 and 170 and housing 5 when clutch 2 is activated. When clutch 2 is de-activated and returns to its disengaged state by means of the biasing force created by spring washers 264–268, O-rings 335 will provide the necessary sealing force.

As previously indicated, it is preferable in accordance with the present invention to form housing 5 of cast aluminum and therefore the axial surfaces 19 and 58 of housing 5 that are engaged by sealing units 155 and 170 would be inherently porous such that the use of these sealing units, in and of themselves, would not be sufficient to enable clutch 2 to also be utilized with liquid fluid mediums, such as hydraulic oil. As indicated above, a typical finish for a pneumatic seal surface is generally insufficient for hydraulic use as the hydraulic oil would become embedded in the surface imperfections and prevent a good sealing surface. Therefore, using hydraulic oil or other liquid mediums would generally tend to contaminate the friction interface between sealing units 155 and 170 and housing 5 such that the liquid medium would weep past the seals. However, in accordance with the present invention, surface portion 19 of inner surface 17 of central housing section 8 and axially extending surface 58 have provided thereon hard anodize coatings. More specifically, portion 19 and surface 58 are each provided with a coating having a TEFLON and epoxy filler such that the TEFLON and epoxy will fill the pores inherent in the surfaces 17 and 58. Surfaces 17 and 58 can then be polished to bring each surface finish to an eight (8) rms mark needed for adequate sealing. Therefore, by providing the coating and filling the pores with the TEFLON and epoxy, as well as finally finishing the inner surfaces 17 and 58, sealing units 155 and 170 can adequately contain the activating fluid medium within the pressure chamber. If any hydraulic oil were to pass sealing unit 155, auxiliary seal 157 would prevent any further intrusion of the liquid medium towards coupling assembly 226. In case any hydraulic oil or other liquid activating medium should bypass sealing unit 155, housing 5 is specifically incorporated with at least one weep line in the form of a passage 336 (see FIG. 1) that extends through central housing section 8 so as to be exposed between first sealing unit 155 and auxiliary seal 157 when piston 140 is shifted towards an activated position. In addition, when a pneumatic or other gaseous fluid medium is utilized, the TEFLON and epoxy will provide the necessary lubrication at inner surface 17 and inner axially extending surface 58 to assure proper seal life.

Figure 5:
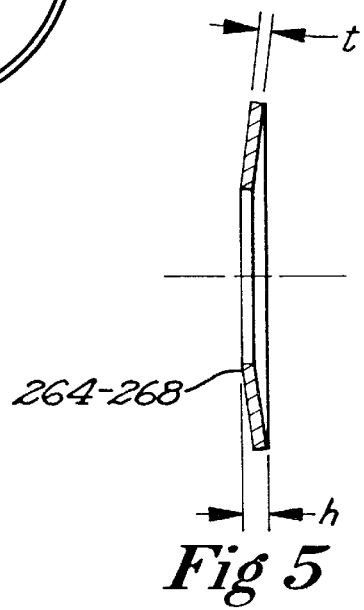
FIG. 5 is a cross-sectional side view of the belleville washer of FIG. 4.

Another important aspect of the present invention concerns the manner in which a constant return or disengagement force is developed within coupling assembly 226 regardless of the amount of wear associated with friction pads 257–261. This aspect of the invention is accomplished by utilizing belleville washers as the spring washers 264–268, as well as arranging the spring washers 264–267 in the back-to-back configuration as described above. Therefore, in accordance with the present invention, the belleville washers are placed in parallel in that they work in tandem to create the desired disengagement force. Such an arrangement effectively increases the stroke of the system but does not increase the resistance of the washers to the activation force. The physical dimensions of the spring washers 264–268 will dictate the linearity of the disengagement force. In accordance with the present invention, it has been found that a belleville washer height-to-thickness (h/t) ratio of approximately 1.4 creates this desired linearity. These referenced thickness and height dimensions are illustrated in FIG. 5.

Based on the above, it should be readily apparent that the apparatus 2 of the present invention can control the transmission of rotational forces between first and second rotatable members by utilizing either liquid or gaseous fluid mediums. From a commercial standpoint, this greatly reduces associated manufacturing costs as it permits a single apparatus to be used in a versatile manner for numerous applications. In addition, such an arrangement presents a desirable safety feature. Assume, for example, that the apparatus is utilized on a vehicle that generally supplies an activating fluid medium in the form of hydraulic oil, but which loses pressure in that system. Another activating fluid medium source, such as an available pneumatic source, could be readily utilized. In addition, this arrangement will enable the same product to be sold for use in various environments which typically require specifically designed units. For example, the same product can be sold for use on a vehicle to power an auxiliary device through the use of a pneumatic pressure source and also sold for use with off road equipment that utilizes an hydraulic pressure source. Furthermore, by utilizing belleville washers and arranging them in the above-described configuration which provides a constant return force, apparatus 2 represents a clutch having a constant torque capacity over the entire range of spring deflection. In addition, it has been found that the use of belleville washers provide the necessary return force needed to disengage coupling assembly 226 even when used in connection with clutches requiring a rather large disengagement force.

Now that the basic teachings of the present invention have been explained, many extensions and variations will be obvious to one having ordinary skill in the art. For example, although the present invention has been explained with respect to a clutch, it should be appreciated that the teachings may apply to other types of torque transfer and/or rotational control apparatus such as, but not limited to, brakes.

Further, although clutch 2 of the most preferred form includes several unique features which are believed to produce synergistic results, such features could be utilized separately or in other combinations. For example, the belleville washer configuration can be utilized in apparatus which are controlled electrically, mechanically, or by any other actuation system. Likewise, although believed to be particularly advantageous for clutch 2 of the preferred form, other apparatus may benefit in a similar manner from the ability to be utilized with various fluid pressure supply sources.

Thus, the invention disclosed herein may be embodied in other specific forms without departing from the spirit or general characteristics thereof and the embodiment described herein is to be considered in all respects illustrative and not restrictive. Instead, the scope of the invention is to be indicated by the appended claims, rather than by the foregoing description, and all changes which come within the meaning and range of equivalency of the claims are intended to be embraced therein.

I claim:

1. An apparatus for controlling relative rotation between an input and an output, with the input being rotatable relative to the output, comprising, in combination: at least a first set of interface elements rotatably related with one of the input and the output; at least a first interface member rotatably related with the other of the input and the output, with the first set of interface elements being positioned on either side of and moveable relative to the first interface member between an engaged position with the first interface member and a disengaged position with the first interface member; first and second spring washers each having a front and a reduce diametric back, with the first and second spring washers being arranged as back-to-back pairs, with the front of each of the first and second spring washers engaging a respective one of the first set of interface elements for biasing the first set of interface elements from the engaged position to the disengaged position; and means for moving the first interface element from the disengaged position to the engaged position against the biasing of the first and second spring washers.

2. The apparatus of claim 1, further comprising, in combination: a second interface element; and third and fourth spring washers arranged as back-to-back pairs for biasing the second interface element in a direction away from the first interface element, with the first interface member being intermediate the first and second interface elements, with the moving means sandwiching the first interface member between the first and second interface elements.

3. The apparatus of claim 1, wherein the spring washers comprise belleville washers.

4. The apparatus of claim 3, wherein each of the belleville washers have associated height (h) and thickness (t) dimensions and a height to thickness ratio (h/t) of approximately 1.4.

5. The apparatus of claim 1, wherein the moving means comprises, in combination: a housing within which the first set of interface elements and the first interface member are relatively rotatably mounted; an actuation member axially shiftably mounted in the housing for movement between an activated position, wherein the actuation member causes the first set of interface elements to engage the first interface member, and a de-activated position, wherein the first set of interface elements is disengaged from the first interface member; a varying volume pressure chamber defined between the housing and the actuation member; and means for introducing a fluid medium into the pressure chamber in order to shift the actuation member from the de-activated position to the activated position.

6. The apparatus of claim 1 wherein the first set of interface elements is spline connected to the input and the first interface member is spline connected to the output.

7. The apparatus of claim 1 wherein the output is rotatable relative to the input.

8. An apparatus for controlling an interconnection between first and second relatively rotatable members, comprising, in combination: at least first and second interface elements connected to the first and second members respectively; at least one friction pad affixed to one of the first and second interface elements, with the friction pad being adapted to frictionally engage the other of the first and second interface elements when the first and second interface elements are shifted from a disengaged position, wherein the first and second members are relatively rotatable, to an engaged position, wherein the first and second members are interconnected; a plurality of belleville washers for biasing the first and second sets of interface elements toward the disengaged position, with each of the belleville washers having associated height (h) and thickness (t) dimensions and a height to thickness ratio (h/t) of approximately 1.4 for biasing with a constant force regardless of wear on the at least one friction pad; and means for selectively shifting the first and second interface elements into the engaged position against the constant force of biasing.

9. The apparatus of claim 8 wherein a plurality of axially spaced first interface elements are provided, with the belleville washers being arranged as back-to-back pairs and each pair of the belleville washers being positioned between adjacent ones of the plurality of first interface elements.

* * * * *

UNITED STATES PATENT AND TRADEMARK OFFICE
CERTIFICATE OF CORRECTION

PATENT NO : 5,913,396

DATED : June 22, 1999

INVENTOR(S) : Dave W. Hein

It is certified that error appears in the above-identified patent and that said Letters Patent is hereby corrected as shown below:

Col. 1, Line 36, delete "ms" and insert -- rms--.

Signed and Sealed this

Fifteenth Day of February, 2000

*Attest:*

Q. TODD DICKINSON

*Attesting Officer*     *Commissioner of Patents and Trademarks*